(12) United States Patent
Takahashi et al.

(10) Patent No.: US 11,148,490 B2
(45) Date of Patent: Oct. 19, 2021

(54) TOWING HOOK MOUNTING STRUCTURE

(71) Applicant: TOYOTA JIDOSHA KABUSHIKI KAISHA, Aichi-ken (JP)

(72) Inventors: Hidenobu Takahashi, Okazaki (JP); Maiko Ikeyoshi, Okazaki (JP); Yusuke Kimura, Toyota (JP); Yuichiro Maruishi, Owariasahi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 328 days.

(21) Appl. No.: 16/265,017

(22) Filed: Feb. 1, 2019

(65) Prior Publication Data

US 2019/0241033 A1    Aug. 8, 2019

(30) Foreign Application Priority Data

Feb. 6, 2018  (JP) ............................. JP2018-018884

(51) Int. Cl.
*B60D 1/48*  (2006.01)

(52) U.S. Cl.
CPC ............. *B60D 1/485* (2013.01); *B60D 1/488* (2013.01)

(58) Field of Classification Search
CPC ..................................................... B60D 1/488
See application file for complete search history.

(56) References Cited

U.S. PATENT DOCUMENTS

| | | | | |
|---|---|---|---|---|
| 6,802,522 B1* | 10/2004 | Park | ....................... | B60D 1/243 |
| | | | | 280/495 |
| 6,896,281 B2* | 5/2005 | Lenzen, Jr. | ............ | B60D 1/488 |
| | | | | 280/495 |
| 7,758,060 B2* | 7/2010 | Lopez | ..................... | B60D 1/488 |
| | | | | 280/495 |
| 7,775,546 B2* | 8/2010 | Asjad | ....................... | B60D 1/54 |
| | | | | 280/498 |
| 8,371,602 B1* | 2/2013 | Peschansky | ............ | B60D 1/488 |
| | | | | 280/495 |
| 10,131,193 B2* | 11/2018 | Degenkolb | ............ | B60D 1/565 |

FOREIGN PATENT DOCUMENTS

| | | | |
|---|---|---|---|
| DE | 1086135 A | 7/1960 | |
| DE | 1996366 U | 11/1968 | |
| JP | S5795263 A | 6/1982 | |
| JP | S6299406 U | 6/1987 | |
| JP | S6395906 U | 6/1988 | |
| JP | H6328924 A | 11/1994 | |
| JP | H8142621 A | 6/1996 | |
| JP | H9277811 A | 10/1997 | |
| JP | H10278524 A | 10/1998 | |
| JP | 2004114734 A | 4/2004 | |
| JP | 2008-189020 A | 8/2008 | |
| KR | 0134884 Y1 * | 2/1999 | |
| WO | WO-2007080677 A1 * | 7/2007 | ............ B60R 19/56 |
| WO | WO-2012168658 A1 * | 12/2012 | ............ B60D 1/565 |

* cited by examiner

*Primary Examiner* — Kevin Hurley

(74) *Attorney, Agent, or Firm* — Hauptman Ham, LLP

(57) ABSTRACT

A towing hook mounting structure includes a frame of a vehicle and a towing hook. The frame includes a first surface and a second surface having a planar direction different from that of the first surface. The towing hook includes a first hook portion and a second hook portion different from the first hook portion. The first hook portion of the towing hook is fixedly mounted to the first surface of the frame, and the second hook portion of the towing hook is fixedly mounted to the second surface of the frame.

20 Claims, 10 Drawing Sheets

TOWING HOOK MOUNTING STRUCTURE

INCORPORATION BY REFERENCE

The disclosure of Japanese Patent Application No. 2018-018884 filed on Feb. 6, 2018 including the specification, drawings and abstract is incorporated herein by reference in its entirety.

BACKGROUND

1. Technical Field

The present disclosure relates to a towing hook mounting structure for mounting a towing hook to a frame of a vehicle.

2. Description of Related Art

Japanese Unexamined Patent Application Publication No. 2008-189020 (JP 2008-189020 A) discloses a technique of bolting a towing hook to solely a lower surface (one surface) of a frame of a vehicle through a bumper stay.

However, the towing hook mounting structure disclosed in JP 2008-189020 A has the following problems. Since a towing hook is bolted to solely the lower surface (one surface) of the frame, the frame holds a load from the towing hook with mainly surface rigidity of the lower surface (one surface). For this reason, in a case where the towing hook is pulled downward due to the difference in height between a towing vehicle and a towed vehicle, traveling on a slope, or the like, so that a downward load is applied to the frame, there is a possibility that the lower surface of the frame may be locally deformed. For this reason, in order to suppress the local deformation of the frame, it is needed to install a reinforcement in the frame.

SUMMARY

The present disclosure provides a towing hook mounting structure capable of suppressing local deformation of a frame regardless of a reinforcement.

The present disclosure is as follows.

An aspect of the present disclosure relates to a towing hook mounting structure. The towing hook mounting structure includes: a frame of a vehicle and a towing hook. The frame includes a first surface and a second surface having a planar direction different from that of the first surface. The towing hook includes a first hook portion and a second hook portion different from the first hook portion. The first hook portion of the towing hook is fixedly mounted to the first surface of the frame. The second hook portion of the towing hook is fixedly mounted to the second surface of the frame (Examples 1, 2).

In the towing hook mounting structure according to the aspect of the present disclosure, the first surface and the second surface of the frame may be mutually adjacent surfaces of the frame (Examples 1, 2).

In the towing hook mounting structure according to the aspect of the present disclosure, the frame may include an upper surface, a lower surface, an outer side surface connecting vehicular outer end portions of the upper surface and the lower surface, and an inner side surface connecting vehicular inner end portions of the upper surface and the lower surface, and the first surface and the second surface of the frame may be any of the upper surface, the lower surface, and the inner side surface (Examples 1, 2).

In the towing hook mounting structure according to the aspect of the present disclosure, the first hook portion may be mounted to the first surface by using a first bracket, and the second hook portion may be mounted to the second surface by using a second bracket (Example 1).

In the towing hook mounting structure according to the aspect of the present disclosure, the first bracket and the second bracket may be connected to each other (Example 1).

In the towing hook mounting structure according to the aspect of the present disclosure, at least one of mounting of the first hook portion to the first surface and mounting of the second hook portion to the second surface may be directly performed by welding or bolting without using a bracket (Example 2).

With the towing hook mounting structure according to the aspect of the present disclosure, the following effects can be obtained. Since the first hook portion of the towing hook is fixedly mounted to the first surface of the frame and the second hook portion of the towing hook is fixedly mounted to the second surface of the frame, the load from the towing hook is not only transmitted from the first hook portion to the first surface of the frame but also transmitted from the second hook portion to the second surface of the frame. Therefore, the load from the towing hook can be dispersed to both the first surface and the second surface of the frame. Further, since the load from the towing hook is transmitted to both the first surface and the second surface of the frame, the load from the towing hook is applied to the entire frame as a torsional force. Therefore, the load from the towing hook can be held by torsional rigidity of the entire frame.

Therefore, since the load can be not only dispersed to the two surfaces but also held by the torsional rigidity of the entire frame, it is possible to suppress local deformation of the frame regardless of a reinforcement.

Further, with the towing hook mounting structure according to the aspect of the present disclosure, the following effect can be obtained. Since the first surface and the second surface of the frame are the mutually adjacent surfaces of the frame, the distance between the first surface and the second surface is short compared to a case where the first surface and the second surface of the frame are surfaces that are not adjacent to each other, such as the mutually facing surfaces of the frame. Therefore, even in a case where the first hook portion of the towing hook is fixedly mounted to the first surface of the frame and the second hook portion of the towing hook is fixedly mounted to the second surface of the frame, the towing hook can be fixedly mounted to the frame from the same direction (in this specification, the "same direction" also includes the meaning of "substantially the same direction"). Therefore, it is possible to enhance the workability of mounting of the towing hook to the frame.

Further, with the towing hook mounting structure according to the aspect of the present disclosure, the following effect can be obtained. Since the first surface and the second surface are any of the upper surface, the lower surface, and the inner side surface of the frame, the amount of protrusion of the towing hook from the frame to the outside of the vehicle can be reduced compared to a case where the first surface or the second surface is the outer side surface of the frame. Further, the joining place between the towing hook and the frame becomes hard to see, and thus the design of the mounting structure can be improved.

Further, with the towing hook mounting structure according to the aspect of the present disclosure, the following effect can be obtained. Each of the mounting of the first hook portion to the first surface and the mounting of the second hook portion to the second surface is performed using a bracket, and therefore, unlike a case where at least one of the first hook portion and the second hook portion is directly fixed to the frame without using a bracket, both the first hook portion and the second hook portion can be disposed at positions away from the frame. For this reason, the degree of freedom of the shape of the towing hook is increased. Therefore, the towing hook can be easily formed, and the towing hook can be manufactured inexpensively.

Further, with the towing hook mounting structure according to the aspect of the present disclosure, the following effect can be obtained. Since the first bracket and the second bracket are connected to each other, the first bracket and the second bracket can be configured as one piece. Therefore, compared to a case where the first bracket and the second bracket are configured as separate parts, the number of parts can be reduced.

Further, with the towing hook mounting structure according to the aspect of the present disclosure, the following effect can be obtained. At least one of the mounting of the first hook portion to the first surface and the mounting of the second hook portion to the second surface is directly performed by welding or bolting without using a bracket, and therefore, compared to a case where both the mounting of the first hook portion to the first surface and the mounting of the second hook portion to the second surface are performed using a bracket, a part cost can be reduced and a reduction in weight can be achieved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 7:
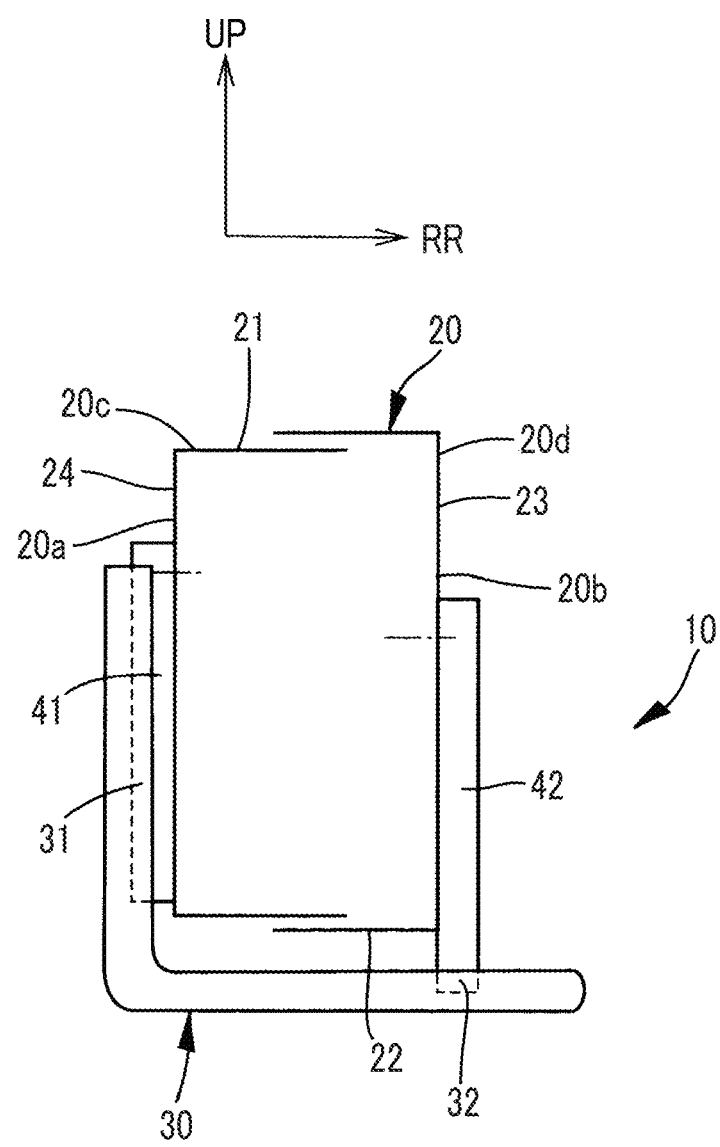
FIG. 7 is a schematic side view in a third modification example of the towing hook mounting structure of Example 1 of the present disclosure.
Figure 8:
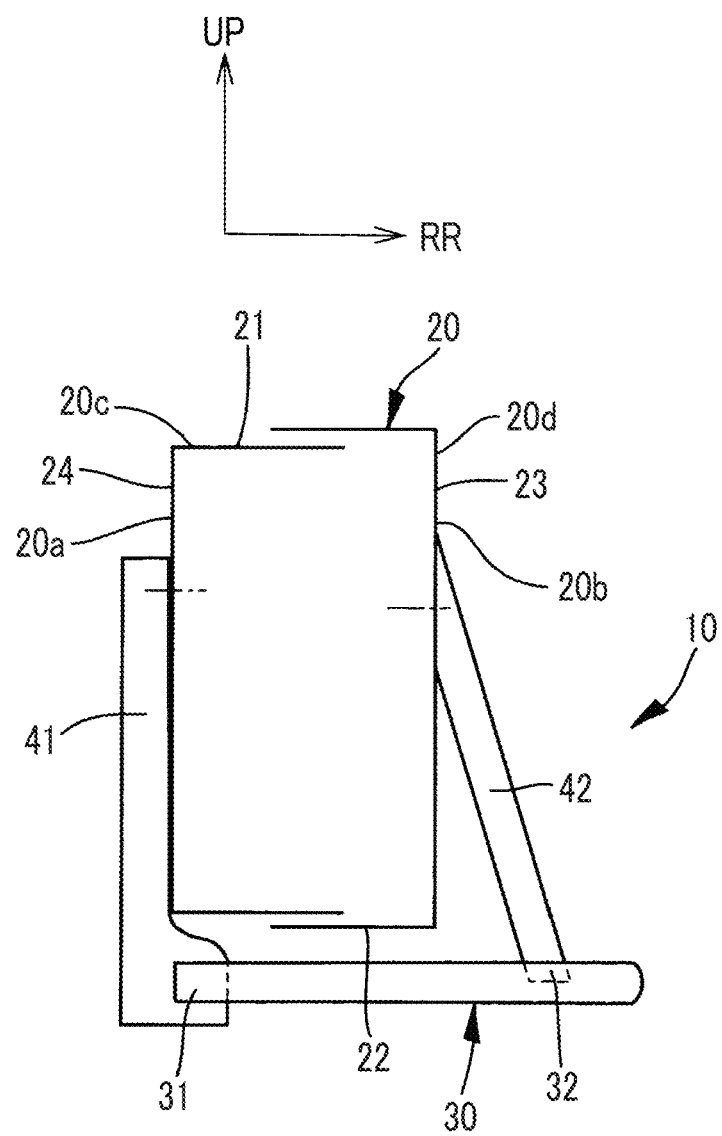
FIG. 8 is a schematic side view in a fourth modification example of the towing hook mounting structure of Example 1 of the present disclosure.
Figure 9:
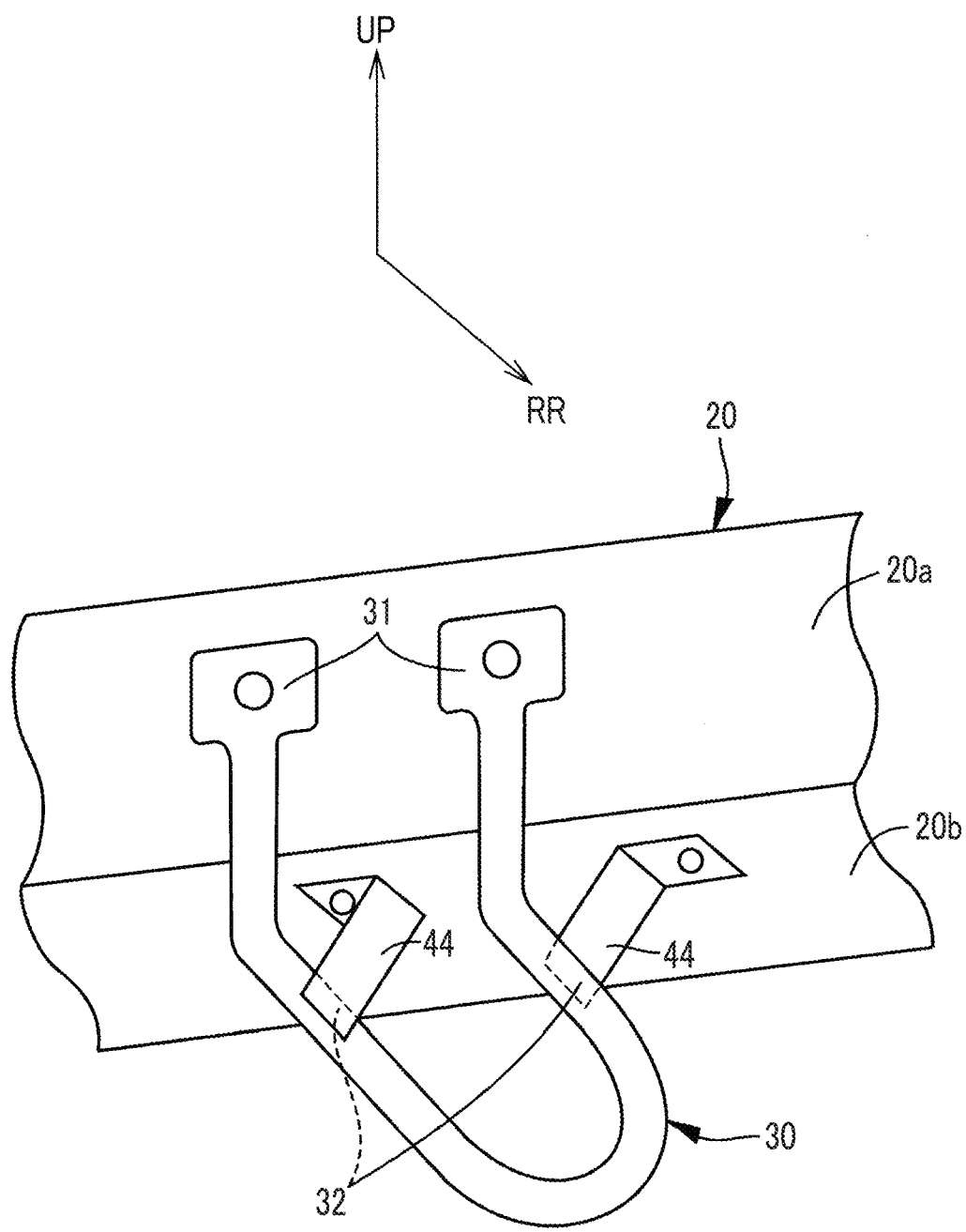
FIG. 9 is a schematic perspective view of a towing hook mounting structure of Example 2 of the present disclosure.
Figure 10:
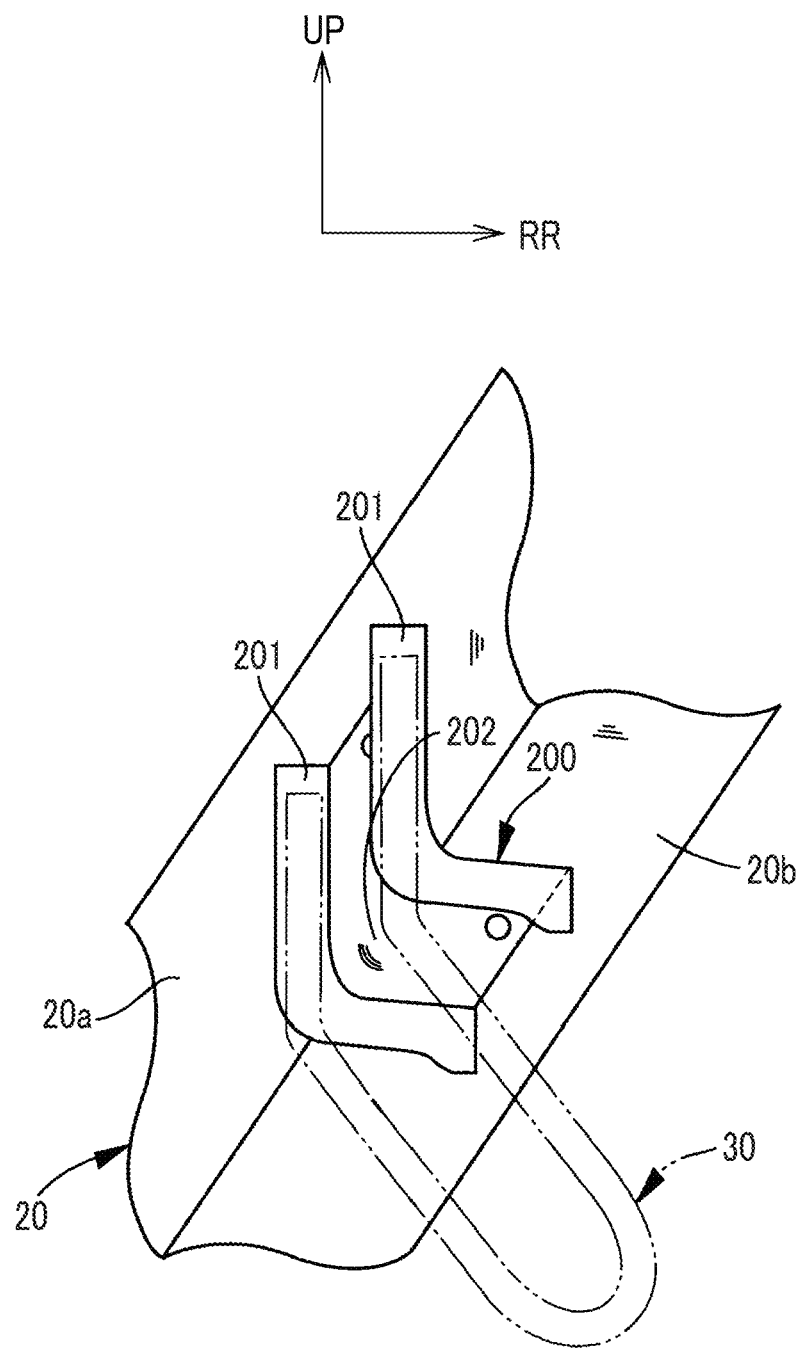
FIG. 10 is a diagram showing a comparative example of the example of the present disclosure and is a perspective view of a bracket and a frame in a case where a load is transmitted not only to a first surface but also to a second surface of the frame by the bracket.

Hereinafter, towing hook mounting structures 10 of examples of the present disclosure will be described with reference to the drawings. FIG. 1 to FIG. 4 show a towing hook mounting structure of Example 1 of the present disclosure, FIG. 5 to FIG. 8 show modification examples of the towing hook mounting structure of Example 1 of the present disclosure, and FIG. 9 shows a towing hook mounting structure of Example 2 of the present disclosure. FIG. 10 shows a comparative example of the example of the present disclosure. Common parts over all the examples of the present disclosure are denoted by the same reference numerals over all the examples of the present disclosure. In the drawings, UP indicates an upper side and RR indicates a rearward of a vehicle.

Figure 1:
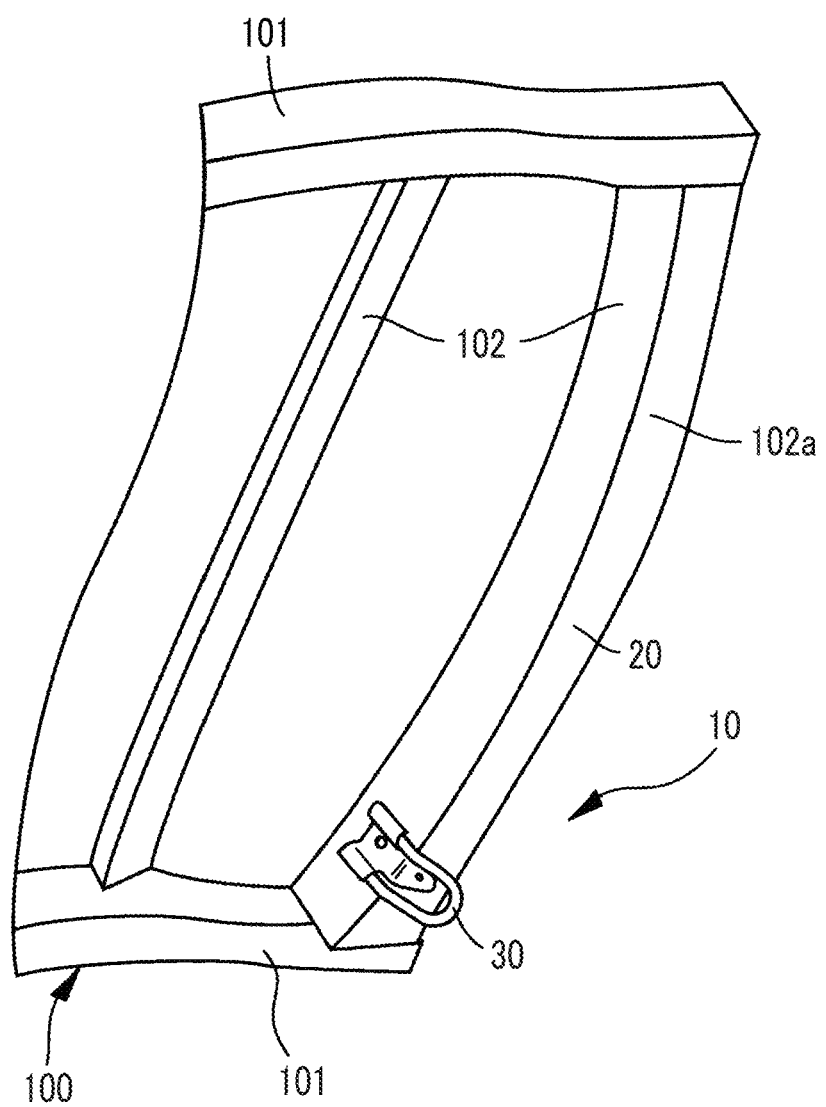
FIG. 1 is a perspective view showing an example of a towing hook and a frame to which the towing hook is mounted, in a towing hook mounting structure of Example 1 of the present disclosure.

First, parts common to all the examples of the present disclosure will be described. The towing hook mounting structure 10 of the example of the present disclosure is provided in a ladder-shaped ladder frame 100 of a vehicle, as shown in FIG. 1. The ladder frame 100 is a ladder-shaped frame when viewed in a plan view and has a pair of side rails 101 extending in a front-rear direction of the vehicle at both end portions in a vehicle width direction, and a cross member 102 extending in the vehicle width direction between the side rails 101. A plurality of cross members 102 is provided such that the cross members 102 are disposed at intervals in the front-rear direction of the vehicle.

The towing hook mounting structure 10 includes a frame 20 of the vehicle and a towing hook 30.

The frame 20 is a rear cross member 102*a* that is provided on the rearmost side of the vehicle, among the cross members 102 of the ladder frame 100. Note that the frame 20 may be a first cross member (not shown) that is provided on the frontmost side of the vehicle, among the cross members 102, or may be the side rail 101.

Figure 4:
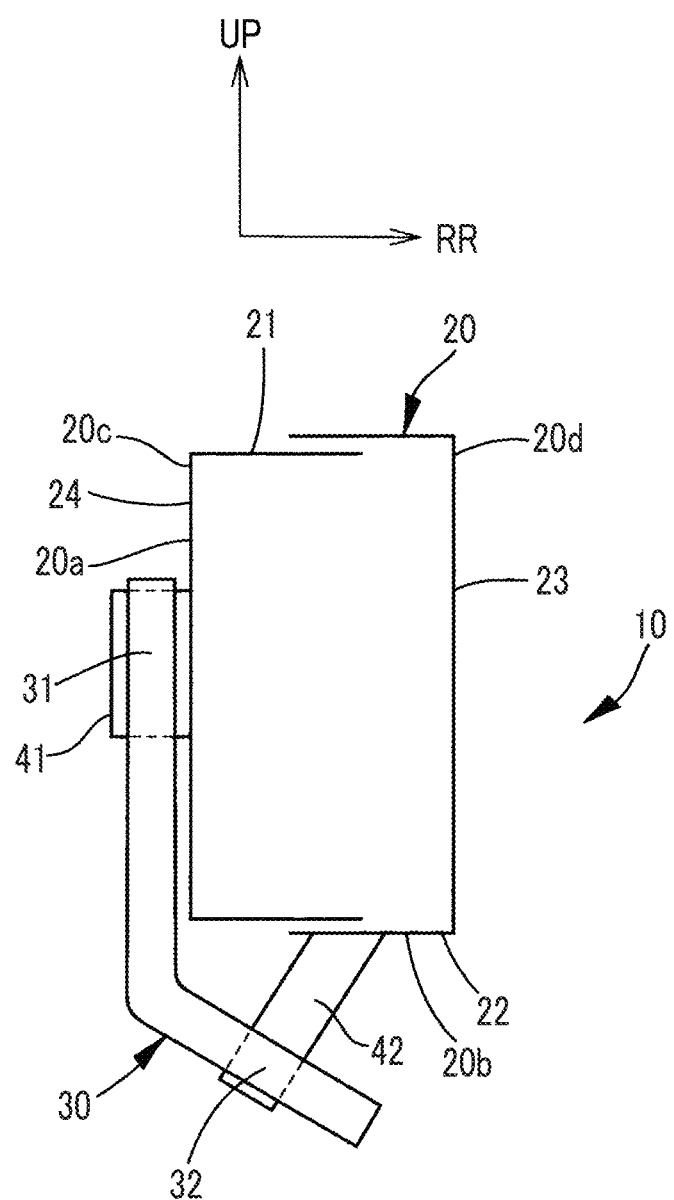
FIG. 4 is a schematic side view of the towing hook mounting structure of Example 1 of the present disclosure.

The frame 20 has a closed cross-section having a rectangular cross-sectional shape, as shown in FIG. 4. The frame 20 has a closed cross-section having a rectangular cross-sectional shape by joining an open end portion of an inner panel 20*c* having a sideway U-shaped cross-section that is open to the outside of the vehicle (the rear side of the vehicle) and an open end portion of an outer panel 20*d* having a sideway U-shaped cross-section that is open to the inside of the vehicle (the front side of the vehicle) by welding or the like. For this reason, the frame 20 has four sides; an upper surface 21, a lower surface 22, an outer side surface 23 connecting vehicular outer end portions of the upper and lower surfaces 21, 22, and an inner side surface 24 connecting vehicular inner end portions of the upper and lower surfaces 21, 22. The upper surface 21, the lower surface 22, the outer side surface 23, and the inner side surface 24 may be referred to as an upper wall, a lower wall, an outer side wall, and an inner side wall, respectively.

The towing hook 30 is mounted to two surfaces of the frame 20 having the four surfaces 21, 22, 23, 24. Hereinafter, the two surfaces of the frame 20 are referred to as a first surface 20*a* and a second surface 20*b*. The first surface 20*a* and the second surface 20*b* have different planar directions.

Figure 2:
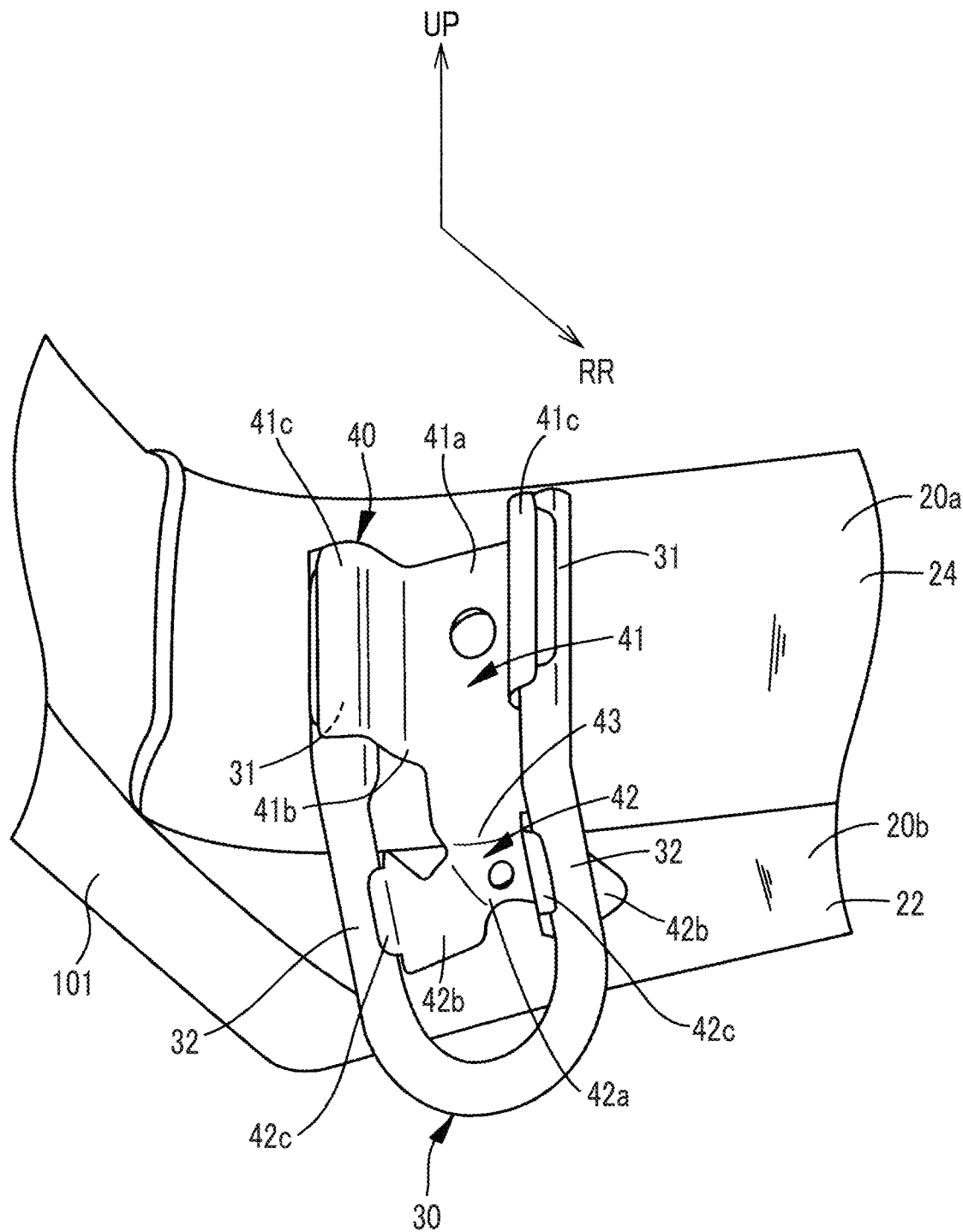
FIG. 2 is a perspective view of the towing hook mounting structure of Example 1 of the present disclosure.
Figure 6:
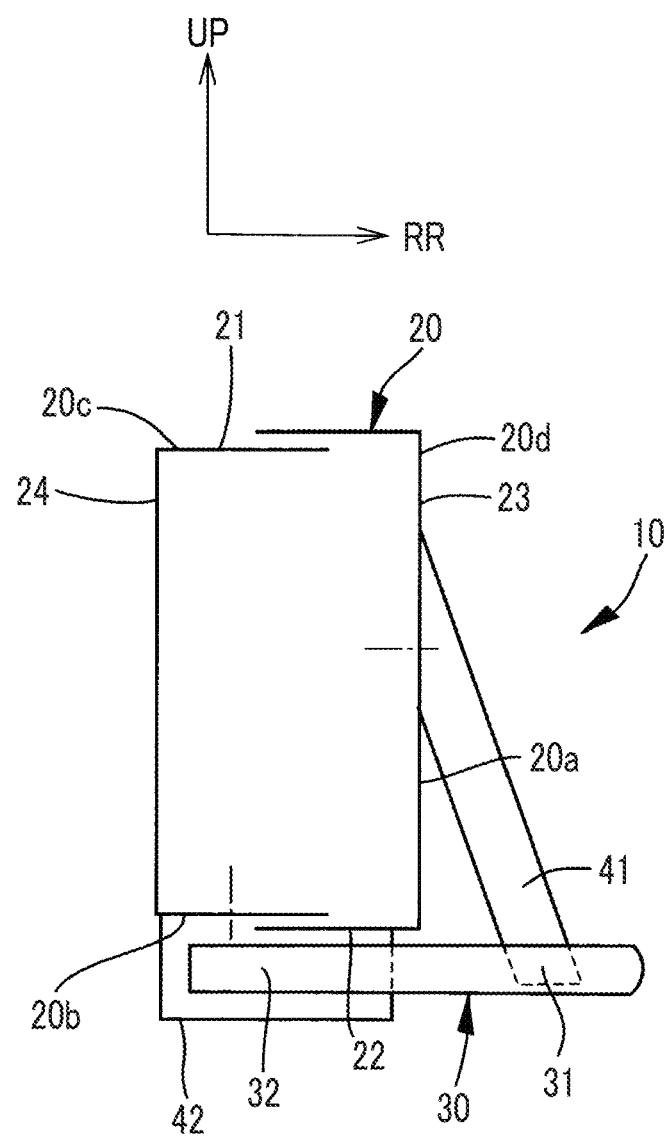
FIG. 6 is a schematic side view in a second modification example of the towing hook mounting structure of Example 1 of the present disclosure.

The first surface 20*a* and the second surface 20*b* are mutually adjacent surfaces of the frame 20, and the mutually adjacent surfaces of the frame 20 are, for example, the inner side surface 24 and the lower surface 22 of the frame 20, as shown in FIG. 2 or FIG. 4. Note that the mutually adjacent surfaces of the frame 20 may be (i) the inner side surface 24 and the upper surface 21 of the frame 20, (ii) the outer side surface 23 and the upper surface 21 of the frame 20, or (iv) the outer side surface 23 and the lower surface 22 of the frame 20. FIG. 6 shows a case where the mutually adjacent surfaces of the frame 20 are the outer side surface 23 and the lower surface 22 of the frame 20.

Further, the first surface 20a and the second surface 20b may be mutually facing surfaces of the frame 20, and the mutually facing surfaces of the frame 20 may be (iv) the upper surface 21 and the lower surface 22 of the frame 20, or (v) the inner side surface 24 and the outer side surface 23 of the frame 20. FIG. 7 and FIG. 8 show cases where the mutually facing surfaces of the frame 20 are the inner side surface 24 and the outer side surface 23 of the frame 20.

The towing hook 30 is provided in order to hook rope (not shown) when a vehicle on which the towing hook 30 is provided is towed by another vehicle, when a vehicle on which the towing hook 30 is provided tows another vehicle, or the like.

Figure 5:
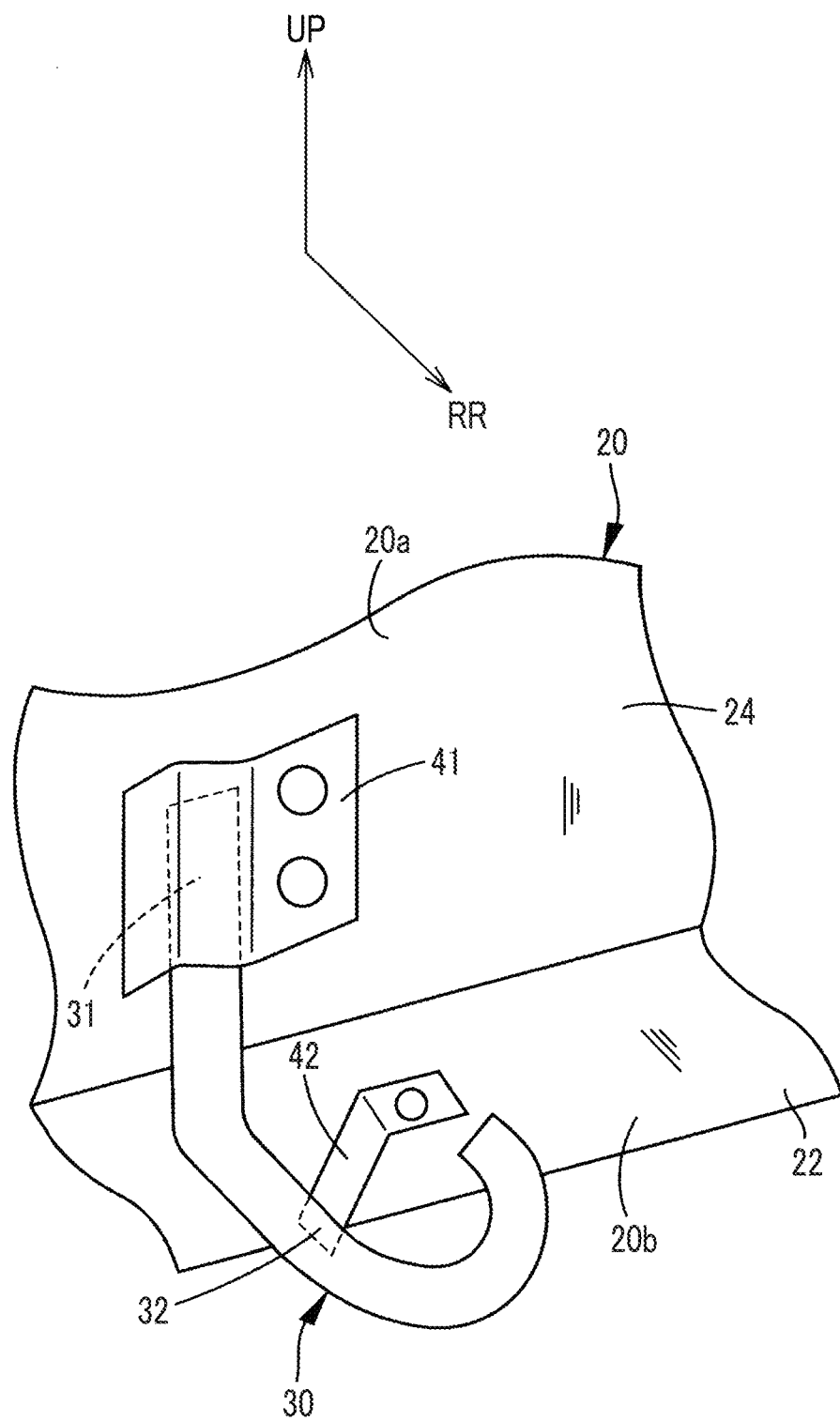
FIG. 5 is a diagram showing a first modification example of the towing hook mounting structure of Example 1 of the present disclosure and is a perspective view in a case where the towing hook has a J-shape.

The towing hook 30 is formed by bending a metallic bar. It is desirable that the towing hook 30 is provided to extend toward the outside of the vehicle when viewed in a side view such that rope (not shown) can be easily hooked from the outside of the vehicle. The towing hook 30 has a "U" shape. Note that the towing hook 30 may have a "J" shape, as shown in FIG. 5, or may have other shapes such as a "T" shape, although not shown in the drawings.

The towing hook 30 has a first hook portion 31 that is fixedly mounted to the first surface 20a of the frame 20 and a second hook portion 32 that is fixedly mounted to the second surface 20b of the frame 20. The first hook portion 31 and the second hook portion 32 are at different positions in the towing hook 30. That is, the towing hook 30 is fixedly mounted to two different surfaces (the first and second surfaces 20a, 20b) of the frame 20 at two different places (the first and second hook portions 31, 32) of the towing hook 30.

Next, operations and effects common to all the examples of the present disclosure will be described.

(A) (a) Since the first hook portion 31 of the towing hook 30 is fixedly mounted to the first surface 20a of the frame 20 and the second hook portion 32 of the towing hook 30 is fixedly mounted to the second surface 20b of the frame 20, the load from the towing hook 30 is not only transmitted from the first hook portion 31 to the first surface 20a of the frame 20 but also transmitted from the second hook portion 32 to the second surface 20b of the frame 20. Therefore, the load from the towing hook 30 can be dispersed to both the first surface 20a and the second surface 20b of the frame 20.

(b) Since the load from the towing hook 30 is transmitted to both the first surface 20a and the second surface 20b of the frame 20, the load from the towing hook 30 is applied, as a torsional force, to the entire frame 20 (the whole in a longitudinal direction of the frame 20, or in a case where the frame 20 is the rear cross member 102a, the whole in the vehicle width direction that is the longitudinal direction of the rear cross member 102a). Therefore, the load from the towing hook 30 can be held by the torsional rigidity of the entire of frame 20.

(c) Due to the above (a) and (b), the load from the towing hook 30 can be not only dispersed to the two surfaces but also held by the torsional rigidity of the entire frame 20, and therefore, it is possible to effectively suppress local deformation of a part (one surface) of the frame 20 due to the load from the towing hook 30. Therefore, it is possible to suppress the local deformation of the frame 20 without increasing the rigidity of the frame 20 by mounting a reinforcement to the interior of the frame 20.

(B) Since the load from the towing hook 30 can be not only dispersed to the two surfaces 20a, 20b but also held by the torsional rigidity of the entire frame 20, it is possible to increase the proof stress of the frame 20 against the load from the towing hook 30. That is, the frame 20 can have higher strength than in the related art. Therefore, even in a case where the towing hook 30 is pulled downward and the downward load is applied to the frame 20, the strength of the frame 20 can be secured. As a result, the towing hook 30 can also be used as a lashing hook that is used when a vehicle is loaded in and transported by a ship or the like. Therefore, compared to a case where a lashing hook is provided separately from the towing hook 30, it is possible to reduce the weight and cost of the vehicle due to a reduction in the number of parts.

(C) Since the load from the towing hook 30 is not only transmitted from the first hook portion 31 to the first surface 20a of the frame 20 but also transmitted from the second hook portion 32 to the second surface 20b of the frame 20, the load transmission paths from the towing hook 30 to the frame 20 are two paths, so that the load transmission efficiency from the towing hook 30 to the frame 20 can be increased compared to a case where the load transmission path from the towing hook 30 to the frame 20 is solely one path.

(D) Since the first surface 20a and the second surface 20b of the frame 20 are the mutually adjacent surfaces of the frame 20, the distance between the first surface 20a and the second surface 20b is short compared to a case where the first surface 20a and the second surface 20b are surfaces that are not adjacent to each other, such as the mutually facing surfaces of the frame 20. Therefore, even in a case where the first hook portion 31 of the towing hook 30 is fixedly mounted to the first surface 20a of the frame 20 and the second hook portion 32 of the towing hook 30 is fixedly mounted to the second surface 20b of the frame 20, the towing hook 30 can be fixedly mounted to the frame 20 from the same direction. Therefore, it is possible to enhance the workability of mounting of the towing hook 30 to the frame 20.

(E) Since the first surface 20a and the second surface 20b of the frame 20 are any of the upper surface 21, the lower surface 22, and the inner side surface 24 of the frame 20, the amount of protrusion of the towing hook 30 from the frame 20 to the outside of the vehicle can be reduced compared to a case where the first surface 20a or the second surface 20b is the outer side surface 23 of the frame 20. Further, the joining place between the towing hook 30 and the frame 20 becomes hard to be seen, and thus the design of the mounting structure 10 can be improved.

(F) FIG. 10 shows a comparative example of the example of the present disclosure. In the comparative example shown in FIG. 10, the towing hook 30 is mounted to the first surface 20a of the frame 20 by using a flanged bracket 200 having a flange 201. The flanged bracket 200 is provided so as to extend from the first surface 20a to the second surface 20b. Further, the flanged bracket 200 is fastened and fixed to each of the first surface 20a and the second surface 20b of the frame 20 by using a bolt (not shown).

Then, the load from the towing hook 30 is transmitted to the first surface 20a of the frame 20 by the flanged bracket 200 and also transmitted to the second surface 20b of the frame 20 by the flanged bracket 200.

Since the load is also transmitted to the second surface 20b of the frame 20 by the flanged bracket 200, the bracket 200 needs to have high rigidity and the flanged bracket 200 requires the flange 201 at a bent portion 202 as well.

However, forming the flange 201 in the bent portion 202 is inferior in formability of the flanged bracket 200, and thus the production efficiency of the flanged bracket 200 deteriorates, so that a part cost increases.

In contrast, in the present disclosure, since the first hook portion 31 of the towing hook 30 is fixedly mounted to the first surface 20a of the frame 20 and the second hook portion 32 of the towing hook 30 is fixedly mounted to the second surface 20b of the frame 20, the load from the towing hook 30 is not only transmitted from the first hook portion 31 to the first surface 20a of the frame 20 but also transmitted from the second hook portion 32 to the second surface 20b of the frame 20. That is, in the present disclosure, the towing hook 30 serves as a member for transmitting a load to both the first surface 20a and the second surface 20b of the frame 20, and the towing hook 30 has the role of the flange 201 of the bent portion 202 of the bracket 200.

Therefore, in the present disclosure, the bracket 200 in which the flange 201 is formed at the bent portion 202 is not needed. Therefore, the production efficiency of the mounting structure 10 is improved compared to the comparative example. Further, compared to the comparative example, the load transmission paths are two paths, so that the load transmission efficiency can be increased.

Next, parts specific to each example of the present disclosure will be described.

Example 1

Figure 3:
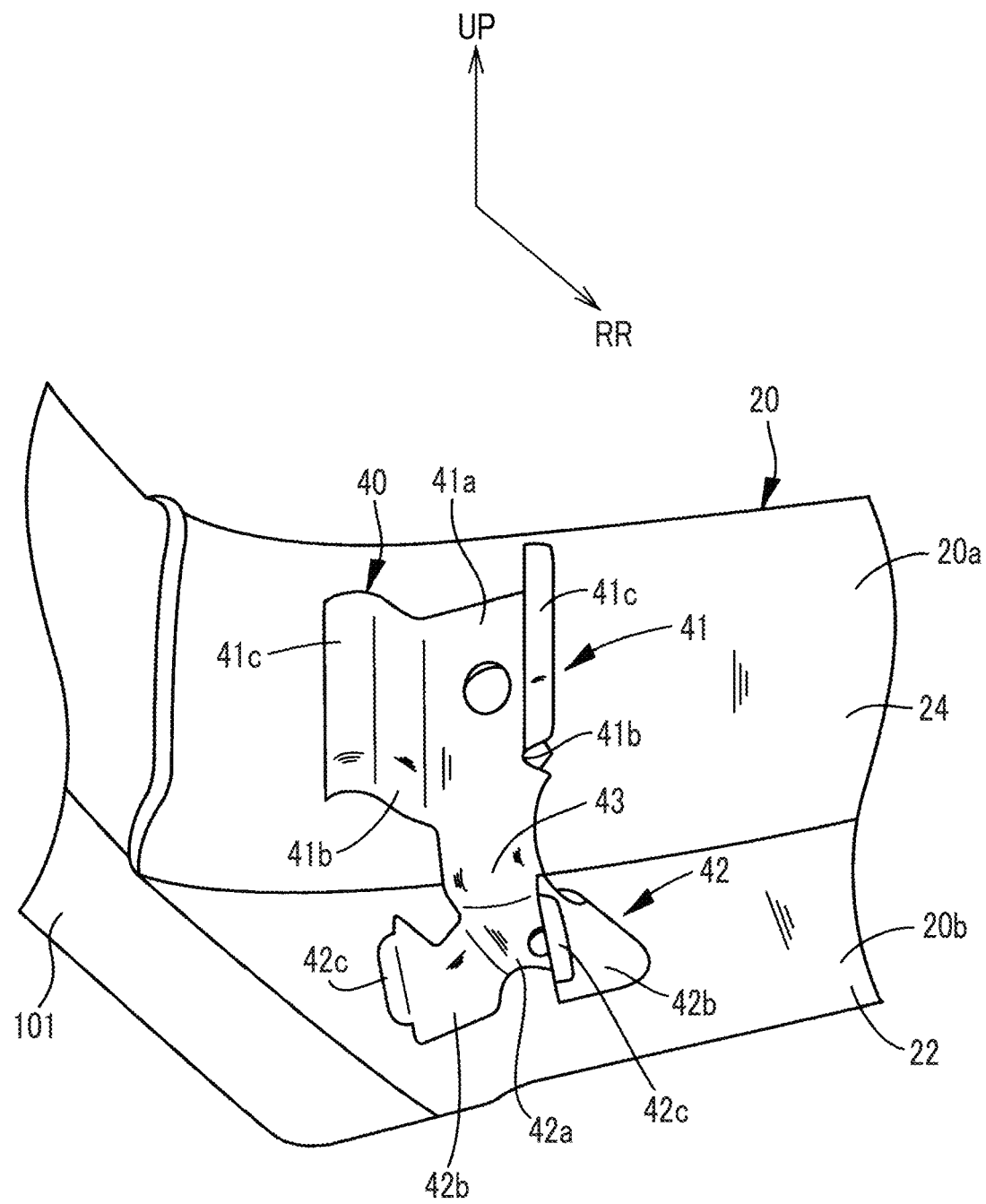
FIG. 3 is a perspective view of a bracket and a frame in the towing hook mounting structure of Example 1 of the present disclosure.

In Example 1 of the present disclosure, as shown in FIG. 2 and FIG. 3, the first hook portion 31 of the towing hook 30 is mounted to the first surface 20a of the frame 20 by using a first bracket 41 and the second hook portion 32 of the towing hook 30 is mounted to the second surface 20b of the frame 20 by using a second bracket 42.

The first bracket 41 is fabricated by pressing a metallic plate material. The first bracket 41 has a fixing portion 41a that is fixed to the first surface 20a of the frame 20 by welding or fastening using a bolt (not shown), an arm portion 41b extending from the fixing portion 41a toward the first hook portion 31 of the towing hook 30, and a hook retaining portion 41c that is provided at a tip portion in an extending direction of the arm portion 41b and welded and fixed to the first hook portion 31 of the towing hook 30 to retain the towing hook 30 at the first hook portion 31.

The second bracket 42 is fabricated by pressing a metallic plate material. The second bracket 42 has a fixing portion 42a that is fixed to the second surface 20b of the frame 20 by welding or fastening using a bolt (not shown), an arm portion 42b extending from the fixing portion 42a toward the second hook portion 32 of the towing hook 30, and a hook retaining portion 42c that is provided at a tip portion in an extending direction of the arm portion 42b and welded and fixed to the second hook portion 32 of the towing hook 30 to retain the towing hook 30 at the second hook portion 32. The second bracket 42 may be welded and fixed to the second hook portion 32 of the towing hook 30 at the arm portion 42b, and in this case, the hook retaining portion 42c may not be provided in the second bracket 42.

The first and second brackets 41, 42 may be configured as separate parts that are made of different plate materials. However, in order to reduce the number of parts, it is desirable that the first and second brackets 41, 42 are configured as one piece that is made of a single plate material. In a case where the first and second brackets 41, 42 are configured as one piece, the first and second brackets 41, 42 are connected to each other by a connecting portion 43. The connecting portion 43 is formed solely by press-bending a flat plate portion of a plate material and does not have a flange (the flange 201 shown in FIG. 10).

In a case where the first and second brackets 41, 42 are configured as one piece, it is desirable that the first surface 20a and the second surface 20b of the frame 20 are not the mutually facing surfaces of the frame 20 but the mutually adjacent surfaces of the frame 20. This is because the length of the connecting portion 43 can be shortened and a bracket 40 having a one-piece configuration, which includes the first and second brackets 41, 42, can be downsized.

In Example 1 of the present disclosure, the following unique effects can be obtained. The mounting of the first hook portion 31 to the first surface 20a and the mounting of the second hook portion 32 to the second surface 20b are respectively performed using the first and second brackets 41, 42, and therefore, unlike a case where at least one of the first hook portion 31 and the second hook portion 32 is directly fixed to the frame 20 without using a bracket, both the first hook portion 31 and the second hook portion 32 can be disposed at positions away from the frame 20. For this reason, the degree of freedom of the shape of the towing hook 30 is increased. Therefore, the towing hook 30 can be easily formed, and the towing hook 30 can be manufactured inexpensively.

Since the first bracket 41 and the second bracket 42 are connected to each other, the first bracket 41 and the second bracket 42 can be configured as one piece. Therefore, compared to a case where the first bracket 41 and the second bracket 42 are configured as separate parts, the number of parts can be reduced, which is advantageous from the viewpoint of cost.

Example 2

In Example 2 of the present disclosure, as shown in FIG. 9, at least one of the mounting of the first hook portion 31 of the towing hook 30 to the first surface 20a and the mounting of the second hook portion 32 to the second surface 20b is directly performed by welding or bolting without using a bracket.

In FIG. 9, a case where the mounting of the first hook portion 31 to the first surface 20a is directly performed by bolting and the mounting of the second hook portion 32 to the second surface 20b is performed using a third bracket 44 is shown. The first hook portion 31 is directly fastened and fixed to the first surface 20a of the frame 20 after the first hook portion 31 is subjected to crushing processing and drilling processing.

In Example 2 of the present disclosure, the following unique effects can be obtained. At least one of the mounting of the first hook portion 31 to the first surface 20a and the mounting of the second hook portion 32 to the second surface 20b is directly performed by welding or bolting without using a bracket, and therefore, compared to a case where both the mounting of the first hook portion 31 to the first surface 20a and the mounting of the second hook portion 32 to the second surface 20b are performed using a bracket, a part cost can be reduced and a reduction in weight can be achieved.

What is claimed is:

1. A towing hook mounting structure comprising:
   a frame of a vehicle, the frame including a first surface and a second surface having a planar direction different from a planar direction of the first surface;

a towing hook that includes a first hook portion and a second hook portion different from the first hook portion, wherein:
the first hook portion of the towing hook is fixedly mounted to the first surface of the frame: and
the second hook portion of the towing hook is fixedly mounted to the second surface of the frame; and
a first bracket for fixedly mounting the second hook portion to the second surface, wherein the first bracket extends from the second surface beyond a surface of the second hook portion closest to the second surface.

2. The towing hook mounting structure according to claim 1, wherein the first surface and the second surface of the frame are mutually adjacent surfaces of the frame.

3. The towing hook mounting structure according to claim 1, wherein:
the frame includes
an upper surface,
a lower surface,
an outer side surface connecting vehicular outer end portions of the upper surface and the lower surface, and
an inner side surface connecting vehicular inner end portions of the upper surface and the lower surface; and
the first surface and the second surface of the frame are any of the upper surface, the lower surface, and the inner side surface.

4. The towing hook mounting structure according to claim 1, wherein:
the first hook portion is mounted to the first surface by using a second bracket.

5. The towing hook mounting structure according to claim 4, wherein the first bracket and the second bracket are connected to each other.

6. The towing hook mounting structure according to claim 1, wherein at least one of mounting of the first hook portion to the first surface and mounting of the second hook portion to the second surface is directly performed by welding or bolting without using a bracket.

7. The towing hook mounting structure according to claim 1, wherein the first surface is parallel to the second surface.

8. The towing hook mounting structure according to claim 1, wherein the first surface is perpendicular to the second surface.

9. The towing hook mounting structure according to claim 1, wherein the vehicle frame further comprises a third surface, and the third surface extends between the first surface and the second surface.

10. The towing hook mounting structure according to claim 1, wherein the first hook portion is directly mounted to the first surface at multiple locations.

11. A towing hook mounting structure comprising:
a frame of a vehicle, the frame including a first surface and a second surface having a planar direction different from a planar direction of the first surface; and
a towing hook that includes a first hook portion and a second hook portion different from the first hook portion, wherein:
the first hook portion of the towing hook is fixedly mounted to the first surface of the frame: and
the second hook portion of the towing hook is fixedly mounted to the second surface of the frame, wherein:
the first hook portion is mounted to the first surface by using a first bracket; and
the second hook portion is mounted to the second surface by using a second bracket.

12. The towing hook mounting structure according to claim 11, wherein the first surface and the second surface of the frame are mutually adjacent surfaces of the frame.

13. The towing hook mounting structure according to claim 11, wherein:
the frame includes
an upper surface,
a lower surface,
an outer side surface connecting vehicular outer end portions of the upper surface and the lower surface, and
an inner side surface connecting vehicular inner end portions of the upper surface and the lower surface; and
the first surface and the second surface of the frame are any of the upper surface, the lower surface, and the inner side surface.

14. The towing hook mounting structure according to claim 11, wherein the first bracket and the second bracket are connected to each other.

15. A towing hook mounting structure comprising:
a towing hook that includes a first hook portion and a second hook portion different from the first hook portion, wherein:
the first hook portion of the towing hook for fixedly mounting to a first surface of a frame of a vehicle, wherein the first surface has a first planar direction; and
the second hook portion of the towing hook for fixedly mounting to a second surface of the frame, wherein the second surface has a second planar direction different from the first planar direction; and
a first bracket for fixedly mounting the second portion to the second surface, wherein the first bracket extends from the second surface beyond a surface of the second hook portion farthest from the second surface.

16. The towing hook mounting structure according to claim 15, wherein the first surface adjoins the second surface.

17. The towing hook mounting structure according to claim 15, wherein:
the first surface or the second surface independently include any of an upper surface of the frame, a lower surface of the frame, an outer side surface connecting vehicular outer end portions of the upper surface and the lower surface, or an inner side surface connecting vehicular inner end portions of the upper surface and the lower surface.

18. The towing hook mounting structure according to claim 15, wherein:
the first hook portion is mounted to the first surface by using a second bracket.

19. The towing hook mounting structure according to claim 18, wherein the first bracket and the second bracket are connected to each other.

20. The towing hook mounting structure according to claim 15, wherein at least one of mounting of the first hook portion to the first surface and mounting of the second hook portion to the second surface is directly performed by welding or bolting without using a bracket.

* * * * *